United States Patent
Alexander et al.

(10) Patent No.: US 6,689,956 B2
(45) Date of Patent: Feb. 10, 2004

(54) ELECTRICAL BUS DUCT SYSTEM WITH HEAT-DISSIPATING ENCLOSURE

(75) Inventors: Robert T. Alexander, Dallas, TX (US); Larry A. Carson, Garland, TX (US); Lloyd D. Sparks, Van Alstyne, TX (US); John T. Leding, Euless, TX (US)

(73) Assignee: Southwestern Battery Supply Company, Inc., Garland, TX (US)

( * ) Notice: Subject to any disclaimer, the term of this patent is extended or adjusted under 35 U.S.C. 154(b) by 0 days.

(21) Appl. No.: 10/116,943

(22) Filed: Apr. 5, 2002

(65) Prior Publication Data

US 2003/0188884 A1 Oct. 9, 2003

(51) Int. Cl.[7] .................................................. H02G 5/06
(52) U.S. Cl. .................. 174/72 B; 174/99 B; 361/624; 361/637; 361/650
(58) Field of Search .............................. 174/48, 49, 50, 174/68.2, 70 B, 72 B, 72 C, 71 B, 88 B, 99 B, 129 B, 149 B; 248/49; 52/220.1, 220.2; 439/212, 213; 361/611, 624, 637, 650

(56) References Cited

U.S. PATENT DOCUMENTS

| | | | | |
|---|---|---|---|---|
| 2,167,378 A | * | 7/1939 | Shoemaker et al. | 174/129 B |
| 2,960,674 A | * | 11/1960 | Harton | 174/99 B |
| 3,125,628 A | * | 3/1964 | Fisher | 174/16.2 |
| 3,681,509 A | * | 8/1972 | Johnston et al. | 174/99 B |
| 3,720,777 A | * | 3/1973 | Sampson et al. | 174/99 B |
| 3,787,016 A | * | 1/1974 | Laval, Jr. | 248/49 |
| 3,895,285 A | * | 7/1975 | Bardahl et al. | 363/141 |
| 4,146,285 A | * | 3/1979 | Cook | 174/88 B |
| 4,507,719 A | * | 3/1985 | Quiogue | 362/404 |
| 4,673,229 A | * | 6/1987 | Jorgensen et al. | 174/68.2 |
| 4,740,167 A | * | 4/1988 | Millhimes et al. | 439/92 |
| 4,929,801 A | * | 5/1990 | Hibbert | 174/16.2 |
| 4,960,253 A | * | 10/1990 | Perrault et al. | 248/68.1 |
| 5,119,268 A | * | 6/1992 | Brown et al. | 361/601 |
| 5,148,348 A | * | 9/1992 | White | 361/658 |
| 5,166,483 A | * | 11/1992 | Kersusan et al. | 218/71 |
| 5,173,572 A | * | 12/1992 | Martin | 174/16.2 |
| 5,316,244 A | * | 5/1994 | Zetena, Jr. | 248/49 |
| 5,586,913 A | * | 12/1996 | Robinson et al. | 439/638 |
| 5,613,750 A | * | 3/1997 | Roe | 362/26 |
| 5,685,634 A | * | 11/1997 | Mulligan | 362/237 |
| 5,747,773 A | * | 5/1998 | Griffin et al. | 219/130.1 |
| 5,854,445 A | * | 12/1998 | Graham et al. | 174/99 B |
| 5,978,221 A | * | 11/1999 | Sawa et al. | 361/704 |
| 6,061,984 A | * | 5/2000 | Rose | 52/220.1 |
| 6,123,438 A | * | 9/2000 | Hentz | 362/373 |
| 6,399,882 B1 | * | 6/2002 | Faulkner et al. | 174/99 B |
| 6,420,963 B1 | * | 7/2002 | Rossetti et al. | 340/310.01 |
| 6,433,999 B1 | * | 8/2002 | Muse et al. | 361/624 |

OTHER PUBLICATIONS

Hawley's Condensed Chemical Dictionary 13th Edition, John Wiley & Sons, Inc., Copyright 1997, p. 896.*

* cited by examiner

Primary Examiner—Dean A. Reichard
Assistant Examiner—Adolfo Nino
(74) Attorney, Agent, or Firm—Tucker Ellis & West LLP

(57) ABSTRACT

An electrical bus system is disclosed in which first and second bus bar assemblies are provided for conducting electrical currents of respective first and second polarities. A bus duct enclosure is provided for enclosing the bus bar assemblies. The bus duct enclosure is adapted to provide a heat dissipative configuration. In one aspect of the invention, the bus duct enclosure can be formed of a substantially polycarbonate material, for providing conductive heat dissipation from the bus bar assemblies.

24 Claims, 5 Drawing Sheets

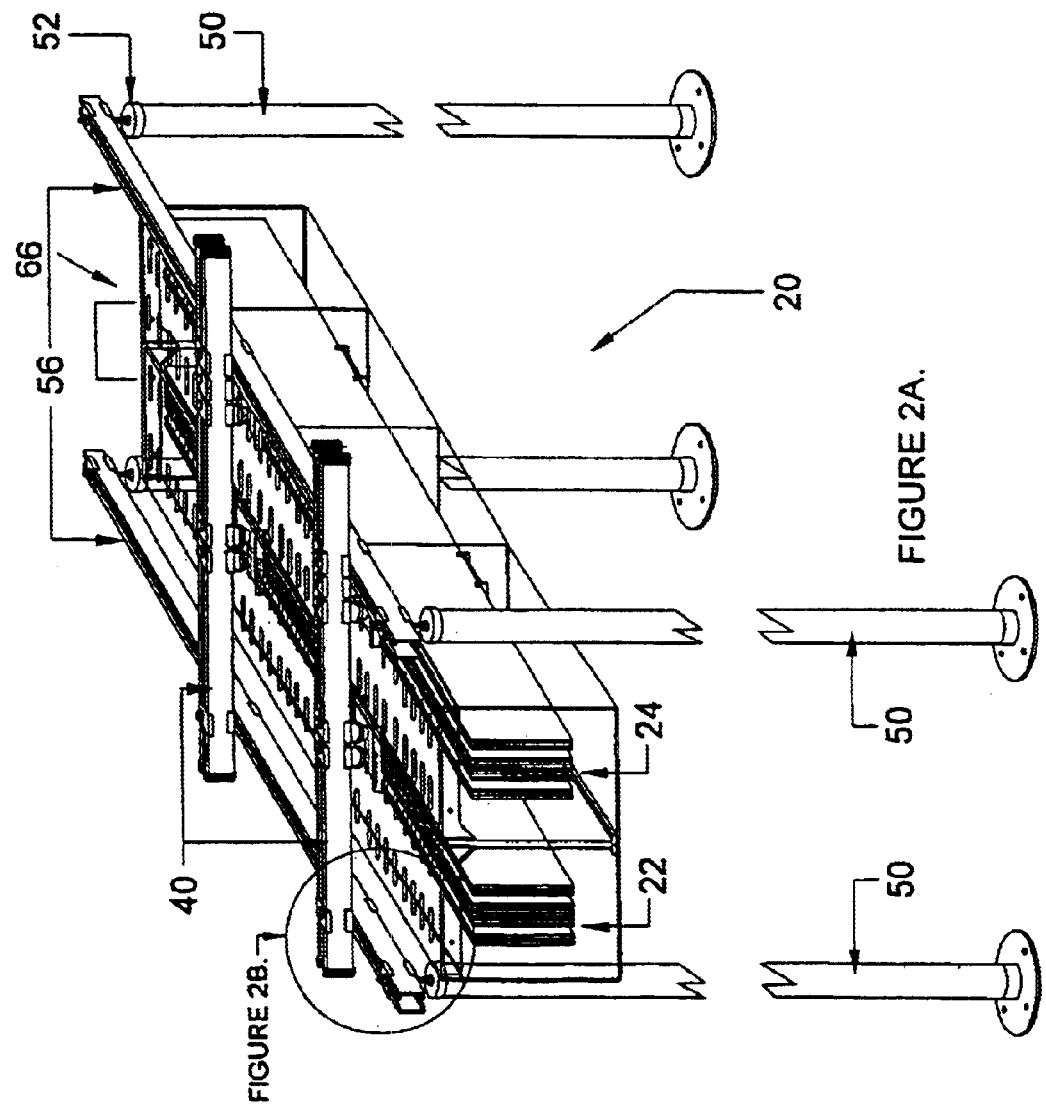
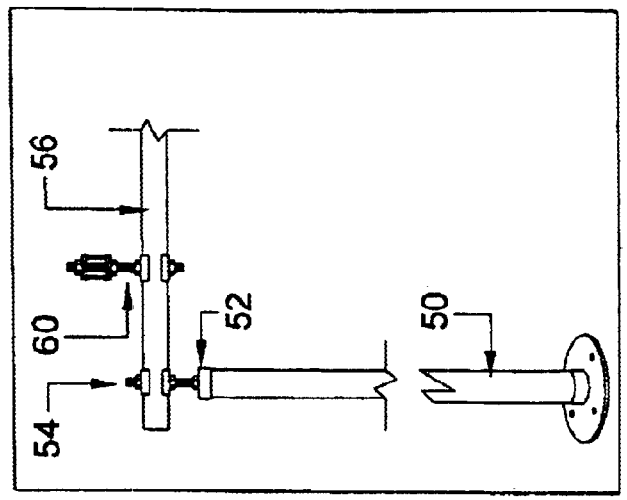
FIGURE 2A.
FIGURE 2B.

ELECTRICAL BUS DUCT SYSTEM WITH HEAT-DISSIPATING ENCLOSURE

BACKGROUND OF INVENTION

The present invention is directed to the field of electrical bus systems, particularly those of the type that carry large currents and thereby produce much excess heat. Electrical bus systems are commonly employed in telecommunications systems such as telephone and fiber optic systems using equipment where low voltages and high currents are required, preferably about 48 volts and 5000–10,000 amperes.

In a typical telecommunications system, alternating current (AC) is received from a supply, e.g., a utility, and passed through a rectifier to convert the current to direct current (DC). The direct current is used to supply the needs of the telecommunications equipment, e.g. telephone and fiber optic systems. As shown in FIG. 1, a telecommunications system 10 receives alternating current (AC) from a supply, e.g., a utility, and passes it through a rectifier 12 to convert the current to direct current (DC). This DC current is used to "float" one or more battery strings 16 to provide the load to the telecommunications system. The battery strings 16 are typically an array of conventional lead-acid or nickel-cadmium batteries. The batteries also provide an additional function of filtering out any signal noise or power spikes in the power supplied by the utility and thereby provide an electrical load at a consistent voltage and current.

Battery strings 16 also provide continuous service in the event of a power failure. A telecommunications office provides service to customers over a geographic area. It is therefore imperative that the equipment remain online even in the event of a power failure. In order to insure continuous operation, it is common to provide emergency backup systems, such as diesel-powered generators. However, a certain amount of startup time is required for generators, and it is important to insure against any power interruptions during this period. In the event of a power failure or other interruption of service, the battery strings 16 supply DC current to the telecommunications system 10, and thereby provide continuous, readily-available power.

Since the currents between the rectifier 12 and the battery strings 16 are very high, it is common to use an assembly of copper bus bars rather than stranded wire. As also shown in FIG. 1, the direct current is conducted between the battery strings 16 and the rectifier 12 along an assembly of bus bar laminations 14. In a typical bus work assembly, a number of bus bars are provided, each being copper plates, typically having widths of about eight inches. The bus bars are typically provided in laminations of as many as fourteen for each electrical polarity, and the laminations of each polarity are separated in order to insure safety.

For safety purposes, one common practice is to enclose the bus bar laminations 14 in a duct work. In this way, the bus bars are protected from external damage, e.g., from water leakage, and accidental short circuits that could result in injury to personnel and damage to equipment. Typically, the two bus bar polarities are retained within a safe proximity, so as to be enclosed within the same duct work assembly. The duct work relies on an air space to provide a degree of electrical isolation. Such duct work has traditionally been fabricated of either galvanized steel or aluminum.

During non-peak usage periods, a bus assembly may only operate at 10% of a maximum load capacity, a current of about 1000 amperes. However, during peak usage times, current loads can approach 100% capacity, about 10,000 amps. This creates a considerable amount of heat in the bus assembly, which reduces conductivity and can result in an undesirable reduction in available service and even damage to the system. This heat problem can be complicated by the duct work enclosure, since the metal ducts absorb the heat from the bus bars and thus retain a considerable amount of heat within the enclosure.

SUMMARY OF THE INVENTION

The difficulties and drawbacks of previous systems are overcome by the electrical bus system of the present invention in which first and second bus bar assemblies are provided for conducting electrical currents of respective first and second polarities. A bus duct enclosure is provided for enclosing the bus bar assemblies. The bus duct enclosure is adapted to provide a heat dissipative configuration. In one aspect of the invention, the bus duct enclosure can be formed of a substantially polycarbonate material, for providing convective heat dissipation from the bus bar assemblies.

As will be realized, the invention is capable of other and different embodiments and its several details are capable of modifications in various respects, all without departing from the invention. Accordingly, the drawing and description are to be regarded as illustrative and not restrictive.

BRIEF DESCRIPTION OF THE DRAWINGS

FIGS. 2A and 2B are respective oblique and side detail views of a bus duct system with heat dissipating enclosure in accordance with the present invention.

DETAILED DESCRIPTION OF THE INVENTION

Figure 1:
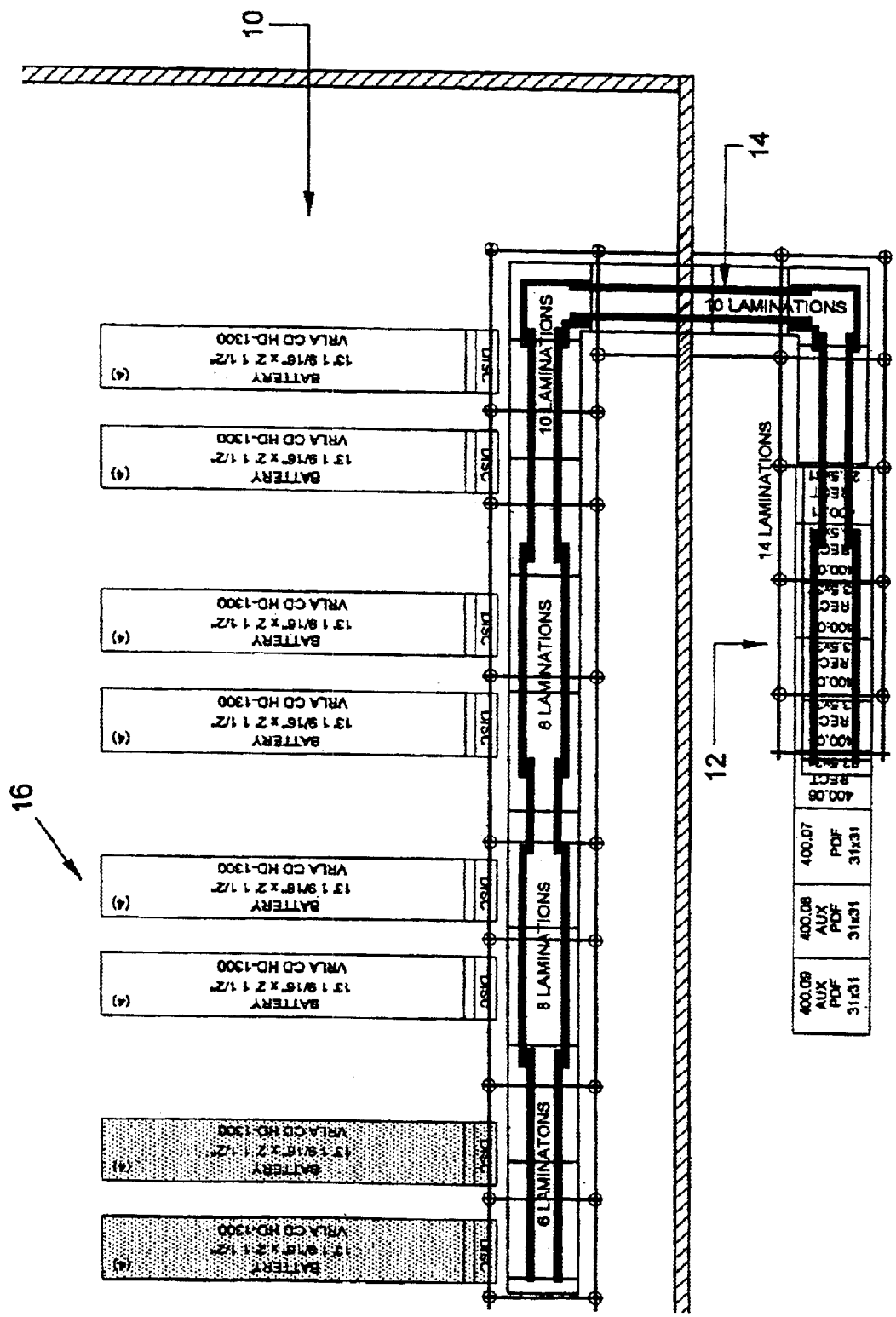
FIG. 1 is a schematic view of a typical bus duct system.
Figure 3B:
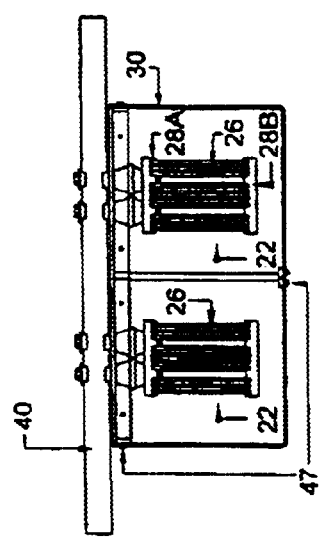
FIGS. 3A and 3B are respective side and side detail views of the bus duct system in accordance with the present invention.
Figure 3A:
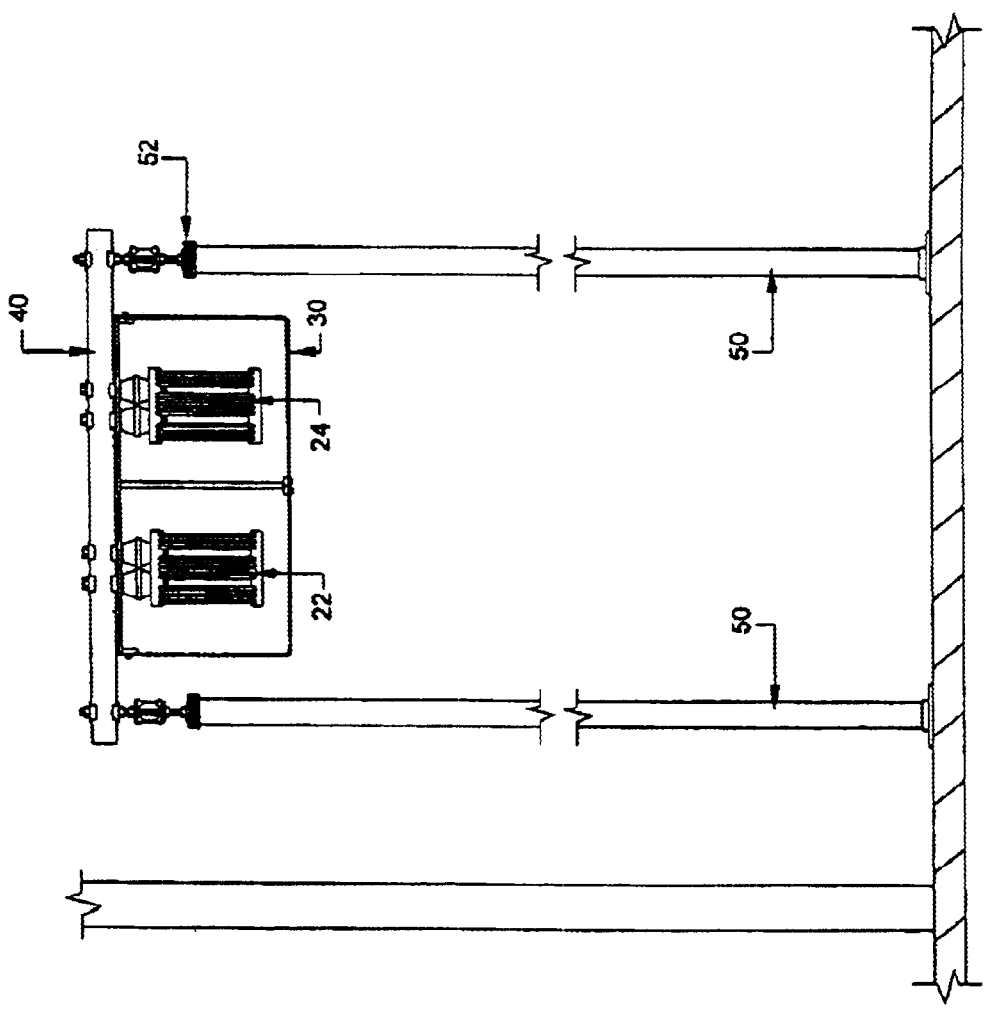

The bus duct system 20 of the present invention is generally depicted in the figures, where like reference numerals are understood to refer to like elements. As can be observed especially from FIGS. 2A, 3A and 3B, the present system 20 includes a first and second bus bar assemblies 22, 24, each corresponding respectively to either a positive or negative electrical polarity, for delivering electrical current to a plurality of battery strings, preferably for use in telecommunications. Each bus bar assembly 22, 24 is formed of a plurality of copper bus bars 26 supported within a bus retainer 28 having top and bottom portions 28A, 28B The embodiment shown in the figures depicts bus bars (8 [in 20,] or 10 [in 24/26] laminations) for each polarity, but up to fourteen can be used for a typical application, and any number of bus bars 26 could be employed without departing from the invention.

In order to provide safety by preventing accidental electrical contact, the bus bar assemblies 22, 24 are enclosed within a bus duct enclosure 30. The present bus duct enclosure 30 is especially configured for heat-dissipation, to prevent the undesirable buildup of heat encountered with previous systems, as will be explained in detail below.

Figure 5C:
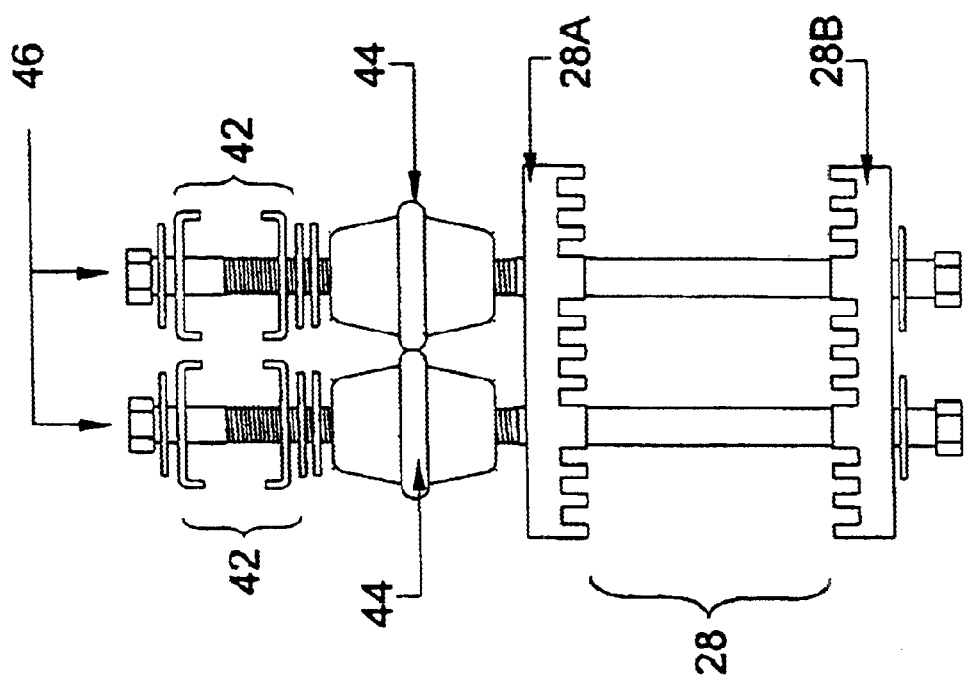
FIGS. 5A, 5B and 5C are respective side views showing the support pole cap, the cross bar receiver and retainer-insulator assembly in accordance with the present invention.

The present bus duct system 20 includes a plurality of cross bars 40 for supporting the bus bar assemblies 22, 24 and the bus duct enclosure 30. The cross bars 40 are mounted transversely to the bus bar assemblies 22, 24. Each of the bus bar assemblies 22, 24 are hung from the respective cross bar 40 by a retainer-insulator assembly 42, as especially shown in, FIG. 5C. Each retainer-insulator assembly includes a pair of two-piece framing clips 42, secured with a threaded bolt and washer arrangement (as shown) for clamping onto the cross bar 40. Each framing clip 42 is secured by inserting a bolt 46 and threaded into a dielectric insulator member 44, which is provided to insure against electrical conduction between the bus bar assemblies 22, 24 and the cross bars 40. In the preferred embodiment, the dielectric insulators 44 are fiberglass standoff insulators of the type manufactured by The Glastic Corporation of Cleveland, Ohio. The top and bottom portions of the bus retainer 28 are supported with bolts that are threaded from below through retainers 28A and [28C] 28B and into the dielectric insulators 44, which are threaded to receive and cooperate with the bolts. In this way, the dielectric insulators 44 include a first attachment portion for connecting to the bus bar assemblies 22, 24. In the preferred embodiment, the bus duct enclosure 30 includes openings to admit the bolts of the framing clips 42 and thereby define a second attachment portion of the dielectric insulator 44 for connecting to the bus duct enclosure 30 in a spaced relationship from the bus bar assemblies 22, 24.

The present cross bars 40 can optionally be affixed to a ceiling structural support member, as is common with previous type systems. However, in the preferred embodiment, as shown especially in FIGS. 2A, 2B and 3A, the bus duct system 20 is supported by a plurality of stanchion support poles 50. As shown in the figures, the stanchion poles 50 extend vertically from the floor, and support the frame rail structure 56, which is attached to the stanchion poles 50, through the use of the support pole cap assembly 52, and through these are attached to either end of the cross bars 40. Preferably, the stanchion pole pairs are spaced about 48 inches apart, so as to insure sufficient support for the weight of the bus duct system 20. The stanchion support poles 50 thus provide an independent system of support not reliant on the physical structure of the building housing the bus duct system 20. In this way, the present bus duct system 20 has greater resistance to seismic activity, since the bus bar assemblies 22, 24 will be more resistant to damage resulting from slippage of the system 20.

Figure 5B:
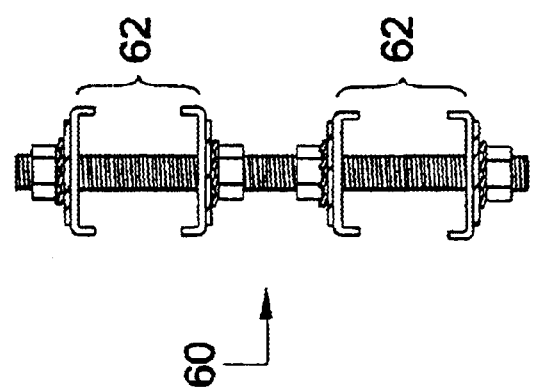
Figure 5A:
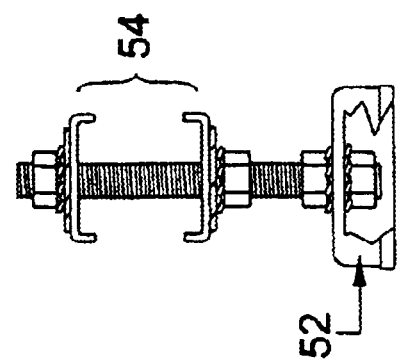

As shown especially in FIGS. 2A, 2B, 3A and 5A, the stanchion poles 50 include stanchion support pole caps 52 for allowing securement of the stanchion poles 50 to a frame rail 56. As shown in FIG. 5A, the pole caps 52 are attached to a two-piece framing clip 54, and bolted with nuts and a threaded rod as illustrated. In this manner, the support caps 52 can be secured directly to the frame rail 56. In the preferred embodiment, as best shown in FIGS. 2A and 2B, the framing clip 54 is attached to a respective frame rail 56, mounted parallel on either side of the bus bar assemblies 22, 24. In this way, the frame rails provide additional stability to the stanchion poles 50. In this preferred embodiment, the frame rails 56 are attached to a cross bar receiver 60, which attaches to the cross bar 40. As shown in FIG. 5B, the cross bar receiver 60 includes a pair of framing clips 62 for respectively attaching to the frame rail 56 on the cross bar 40 to be securely bolted. In this way, the present invention provides a sturdy support system that is resistant to seismic disturbances and easily assembled and maintained in accordance with the requirements of the system.

An important aspect of the invention is the heat-dissipation functions of the present bus duct enclosure 30. With the present invention, it was desirable to satisfactorily dissipate heat in an enclosure for bus bar assemblies operating at a maximum current load of 10,000 amperes over a four-hour peak usage interval. Applicants have discovered that heat build up can be satisfactorily controlled by providing a sufficiently large enclosure formed of materials having thermal transfer properties superior to those of the previous-type metal enclosures. It has been discovered that certain polymer materials have a high rate of conductive heat transfer between the air temperatures of the interior and exterior of the enclosure 30, thereby quickly dissipating heat. In particular, excellent results were obtained using polycarbonate materials such as the type sold under the brand name "Lexan" by General Electric of Schenectady, N.Y.

It has also been observed that heat dissipation can be improved by providing an enclosure sufficiently large to provide adequate volume within, so as to maintain a desired equilibrium temperature inside the enclosure, preferably in the range of between 74° F. to 98.6° F. It has been found that providing standard enclosures 30 having a width of between 28.375 inches and 32.125 inches would accommodate bus bar assemblies having between six and fourteen laminations and allow between 4.375 and 5.25 inches of clearance along the exterior sides of the enclosure 30. In this way, sufficient volume is provided and avoid heat build up and allow convection within the volume to transfer heat to the walls of the enclosure 30, thereby dissipating the heat to the outside environment. Alternatively, it is contemplated to use an integrated fan system 66 operated by the bus voltage, and in connection with the first and second bus bar assemblies.

It may be desirable for certain applications to use a pigmented polycarbonate enclosure [26] 30 to provide a desired color or appearance. However, it has been discovered to be most advantageous to fabricate the enclosure [26] 30 in an unpigmented state, so as to provide a substantially transparent enclosure [26] 30. In such an enclosure [26] 30 heat can be directly radiated through the enclosure [26] 30 from the bus bar laminations 22, 24, and thereby provide radiative heat dissipation.

Figure 4:
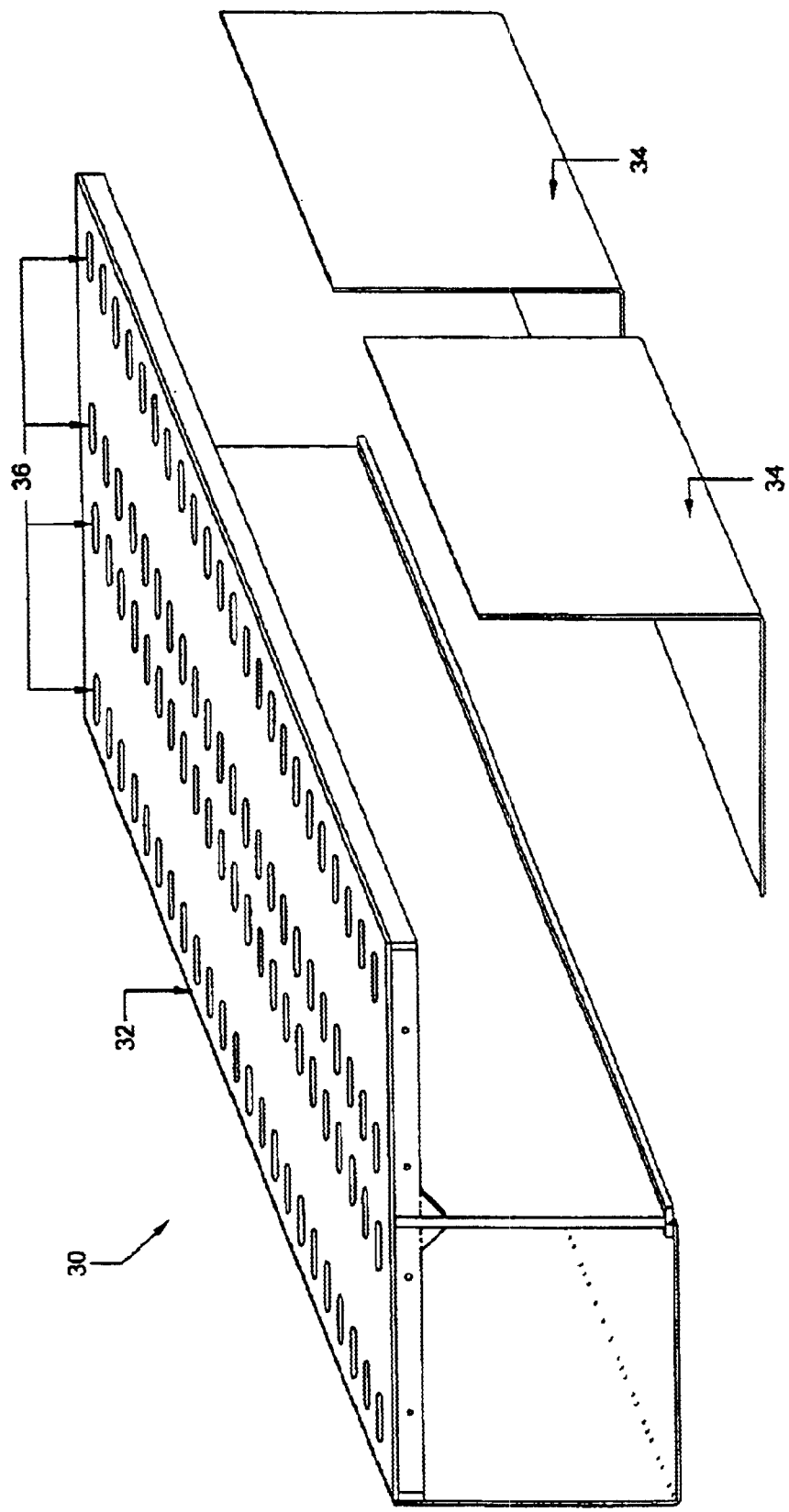
FIG. 4 is a partially exploded oblique view of the heat-dissipating enclosure of the present invention.

As shown especially in FIG. 4, the present enclosure 30 is formed in a sectional configuration. In the preferred embodiment, a T-top section 32 is formed which defines the enclosure 30 and the middle insulator portion for separating and insulating the bus bar assemblies 22, 24. The T-top 32 receives and retains a plurality of outer cover sections 34 for forming the sides and bottom of the enclosure. As especially shown in FIG. 3B, the sections 32, 34 are interlocking and are preferably secured using stainless steel screws 47 and nylon nuts and bolts to secure the ends of contiguous sections 32. In this way, the enclosure 30 defines a substantially rectangular cross-section. Of course, it is to be understood that the T-top 32 and outer covers 34 can be formed of any shape to provide any curved or angular cross section, all without departing from the invention.

In another aspect of the invention, the enclosure 30 can be made to include a plurality of ventilation apertures 36. As shown in FIG. 4, these can be formed into the T-top 32. They can also be optionally formed into the outer covers 34 to provide an open air flow throughout the interior volume of the enclosure 30. The apertures 36 can be machined into the enclosure sections 32, 34. However, the apertures 36 can also be molded directly into the polycarbonate components during a manufacturing step, thereby obviating the need for a separate machining step. To further improve heat dissipation, the enclosure 30 can also be formed to include a number of radiator fins, thereby increasing the surface area of the enclosure 30 and further improving heat dissipation.

By fabricating the present enclosure from a polymer material such as polycarbonate, the heat transfer properties of the enclosure are greatly improved. Also, polycarbonate offers many other ancillary benefits as used for the present duct work enclosure. As with other polymer materials, polycarbonate is a better insulator than metal, providing additional safety. Polycarbonate is also light weight, reducing the overall weight of the bus duct assembly. It is also inexpensive and easy to machine or mold, thereby adding an economic benefit. It is also less rigid than metal, providing a degree of resiliency and ease of installation over metal enclosures. Also, in its transparent embodiment, the enclosure can be visually inspected, allowing field personnel to quickly determine if corrosion, slippage or any other type of physical damage occurs with the bus bar assemblies 22, 24.

As described hereinabove, the present invention solves many problems associated with previous type apparatuses. However, it will be appreciated that various changes in the details, materials and arrangements of parts which have been herein described and illustrated in order to explain the nature of the invention may be made by those skilled in the art within the principle and scope of the invention will be expressed in the appended claims.

What is claimed is:

1. A electrical bus system comprising:
a first bus bar assembly for conducting electrical current of a first polarity;
a second bus bar assembly for conducting electrical current of a second polarity;
a bus duct enclosure for substantially enclosing the first and second bus bar assemblies, wherein the bus duct enclosure is formed of a substantially polycarbonate material, for providing conductive heat dissipation;
a plurality of cross bars for supporting the bus bar assemblies and the bus duct enclosure, wherein the bus bar assemblies are hung from the cross bars by a plurality of retainer-insulator assemblies each having a dielectric insulator member.

2. The electrical bus system of claim 1 wherein the bus duct enclosure is substantially transparent for providing radiative heat dissipation.

3. The electrical bus system of claim 1 wherein the bus duct enclosure comprises a plurality of ventilation apertures.

4. The electrical bus system of claim 3 wherein the bus duct enclosure includes a top section and wherein the ventilation apertures are formed therein.

5. The electrical bus system of claim 1 wherein the bus duct enclosure comprises a substantially rectangular cross-section.

6. The electrical bus system of claim 1 wherein the bus duct enclosure comprises an insulator portion for separating the first and second bus bar assemblies.

7. The electrical bus system of claim 1 wherein the bus duct enclosure comprises a plurality of interlocking components.

8. The electrical bus system of claim 1 wherein each dielectric insulator member has a first attachment portion for connecting to a respective bus bar assembly, and a second attachment portion for connecting to the bus duct enclosure in a spaced relationship.

9. The electrical bus system of claim 1 wherein the cross bars are supported upon a plurality of stanchion support poles.

10. The electrical bus system of claim 9 wherein each stanchion support pole is topped with a support pole cap for securement to a respective cross bar.

11. An electrical bus system comprising:
a first bus bar assembly for conducting electrical current of a first polarity;
a second bus bar assembly for conducting electrical current of a second polarity;
a bus duct enclosure for substantially enclosing the first and second bus bar assemblies, wherein the bus duct enclosure is formed of polycarbonate, for providing conductive heat dissipation, and
wherein the bus duct enclosure is formed in a sectional configuration comprising a plurality of outer cover sections for forming sides and bottom of the bus duct enclosure;
wherein the bus duct enclosure includes a T-top section for defining the bus duct enclosure and comprising a middle insulator portion for separating and insulating the bus bar assemblies, wherein the T-top section is configured to receive and retain the plurality of outer cover sections.

12. The electrical bus system of claim 11 wherein the T-top section and the plurality of outer cover sections are interlocking components.

13. The electrical bus system of claim 11 wherein the bus duct enclosure is substantially transparent for providing radiative heat dissipation.

14. The electrical bus system of claim 11 wherein the bus duct enclosure comprises a plurality of ventilation apertures.

15. The electrical bus system of claim 11 wherein the bus duct enclosure comprises a plurality of ventilation apertures formed in the T-top section.

16. The electrical bus system of claim 11 wherein the bus duct enclosure comprises a substantially rectangular cross-section.

17. The electrical bus system of claim 11 wherein the bus duct enclosure comprises an insulator portion for separating the first and second bus bar assemblies.

18. The electrical bus system of claim 11 wherein the bus duct enclosure comprises a plurality of interlocking components.

19. The electrical bus system of claim 11 further comprising a plurality of cross bars for supporting the bus bar assemblies and the bus duct enclosure.

20. The electrical bus system of claim 19 wherein the bus bar assemblies are hung from the cross bars by a plurality of retainer-insulator assemblies each having a dielectric insulator member.

21. The electrical bus system of claim 20 wherein each dielectric insulator member has a first attachment portion for connecting to a respective bus bar assembly, and a second attachment portion for connecting to the bus duct enclosure in a spaced relationship.

22. The electrical bus system of claim 19 wherein the cross bars are supported upon a plurality of stanchion support poles.

23. The electrical bus system of claim 22 wherein each stanchion support pole is topped with a support pole cap for securement to a respective cross bar.

24. The electrical bus system of claim 11 further comprising an integrated fan system in connection with the first and second bus bar assemblies and operated by the bus voltage.

* * * * *